US006430038B1

(12) United States Patent
Helot et al.

(10) Patent No.: US 6,430,038 B1
(45) Date of Patent: Aug. 6, 2002

(54) COMPUTER WITH ARTICULATED MECHANISM

(75) Inventors: Jacques H. Helot, Rotterdam (NL); Michael D Derocher; Gerald W Steiger, both of Corvallis, OR (US); James R. Cole, Albany, OR (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/551,283

(22) Filed: Apr. 18, 2000

(51) Int. Cl.[7] ............................. H05K 5/02; H05K 7/16; G06F 1/16
(52) U.S. Cl. ...................... 361/681; 361/683; 248/917; 248/920; 349/58
(58) Field of Search ................................ 361/681–683; 348/794; 248/917–923, 157, 161, 420, 346.03, 346.04; 349/58

(56) References Cited

U.S. PATENT DOCUMENTS

| | | | | |
|---|---|---|---|---|
| 4,859,092 A | | 8/1989 | Makita | 400/83 |
| 5,103,376 A | | 4/1992 | Blonder | 361/393 |
| 5,255,214 A | | 10/1993 | Ma | 364/708.1 |
| 5,345,362 A | | 9/1994 | Winkler | 361/681 |
| 5,494,447 A | * | 2/1996 | Zaidan | 439/31 |
| 5,668,570 A | | 9/1997 | Ditzik | 345/173 |
| 6,005,767 A | * | 12/1999 | Ku et al. | 361/681 |
| 6,134,103 A | * | 10/2000 | Ghanma | 361/681 |
| 6,229,693 B1 | * | 5/2001 | Karidis et al. | 361/681 |
| 6,233,138 B1 | * | 5/2001 | Osgood | 361/681 |
| 6,262,885 B1 | * | 7/2001 | Emma et al. | 361/683 |

FOREIGN PATENT DOCUMENTS

| JP | 5-173668 | * | 7/1993 | G06F/1/16 |
|---|---|---|---|---|
| JP | 6-83479 | * | 3/1994 | G06F/1/16 |

OTHER PUBLICATIONS

"Adjustable Height Docking Station And Computing Device For Use Therewith", Hewlett–Packard Company Patent Application Docket No. 10970009–1, PTO Serial No. 08/961,580, Filed Oct. 31, 1997, pp. 1–21.

* cited by examiner

Primary Examiner—Anatoly Vortman

(57) ABSTRACT

A computer that includes a computer base and a display. The computer base has a user edge and a rear edge and the display has a viewing surface, a back surface, and a bottom edge. The rear edge of the computer base is interconnected to the bottom edge of the display by an articulated mechanism. The articulated mechanism enables the display to rotate about the bottom edge of the display at any of a plurality of viewing angles and also orients the display above the computer base in a plurality of positions. The display and articulated mechanism can be folded to a folded position. Optionally, a pop-up mechanism permits the articulated mechanism to pop-up from the folded position when triggered by the user.

16 Claims, 8 Drawing Sheets

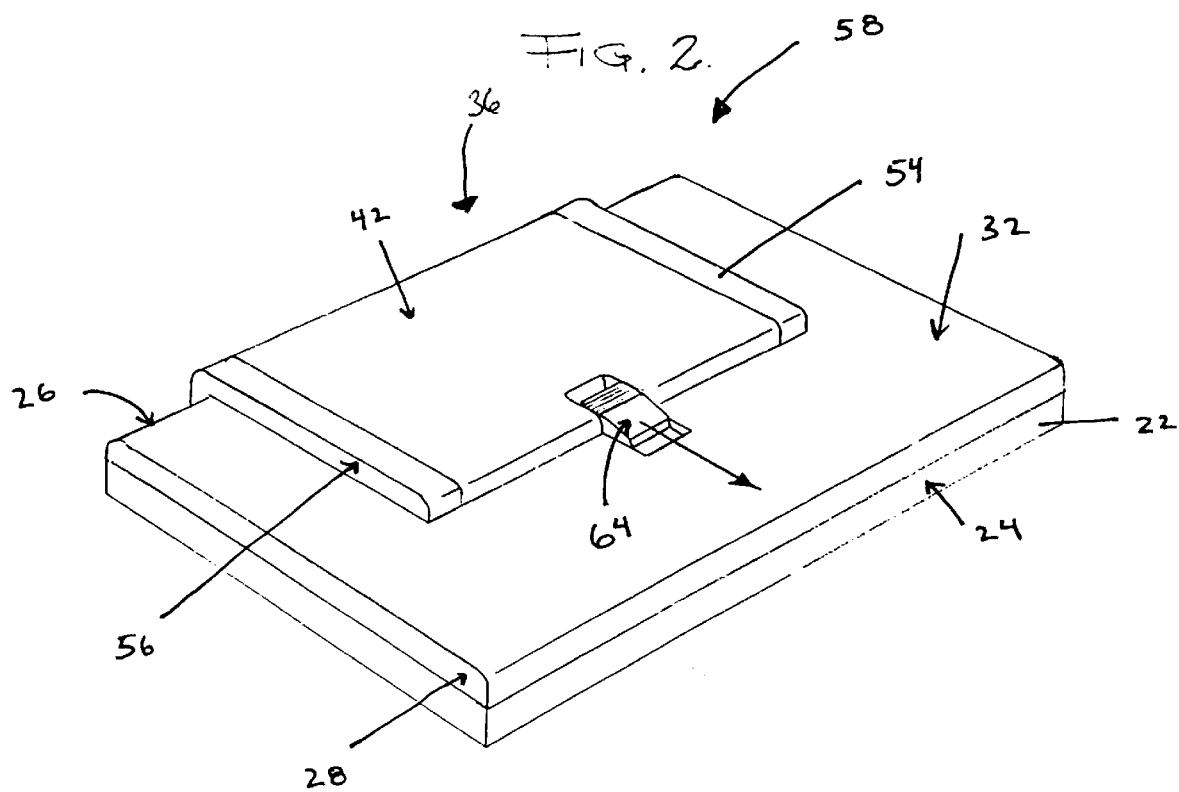
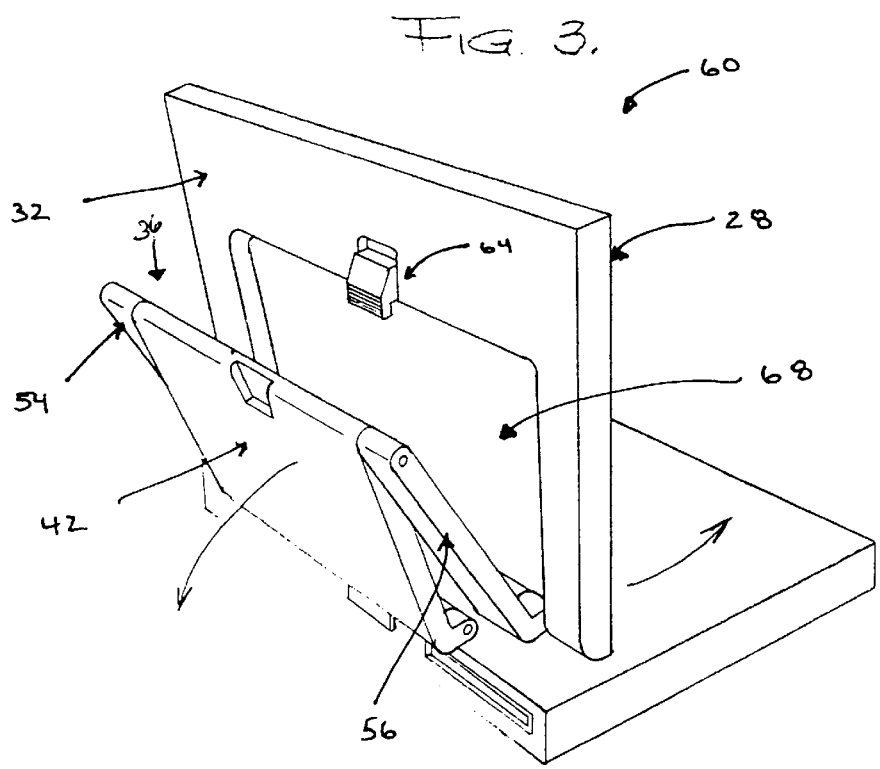

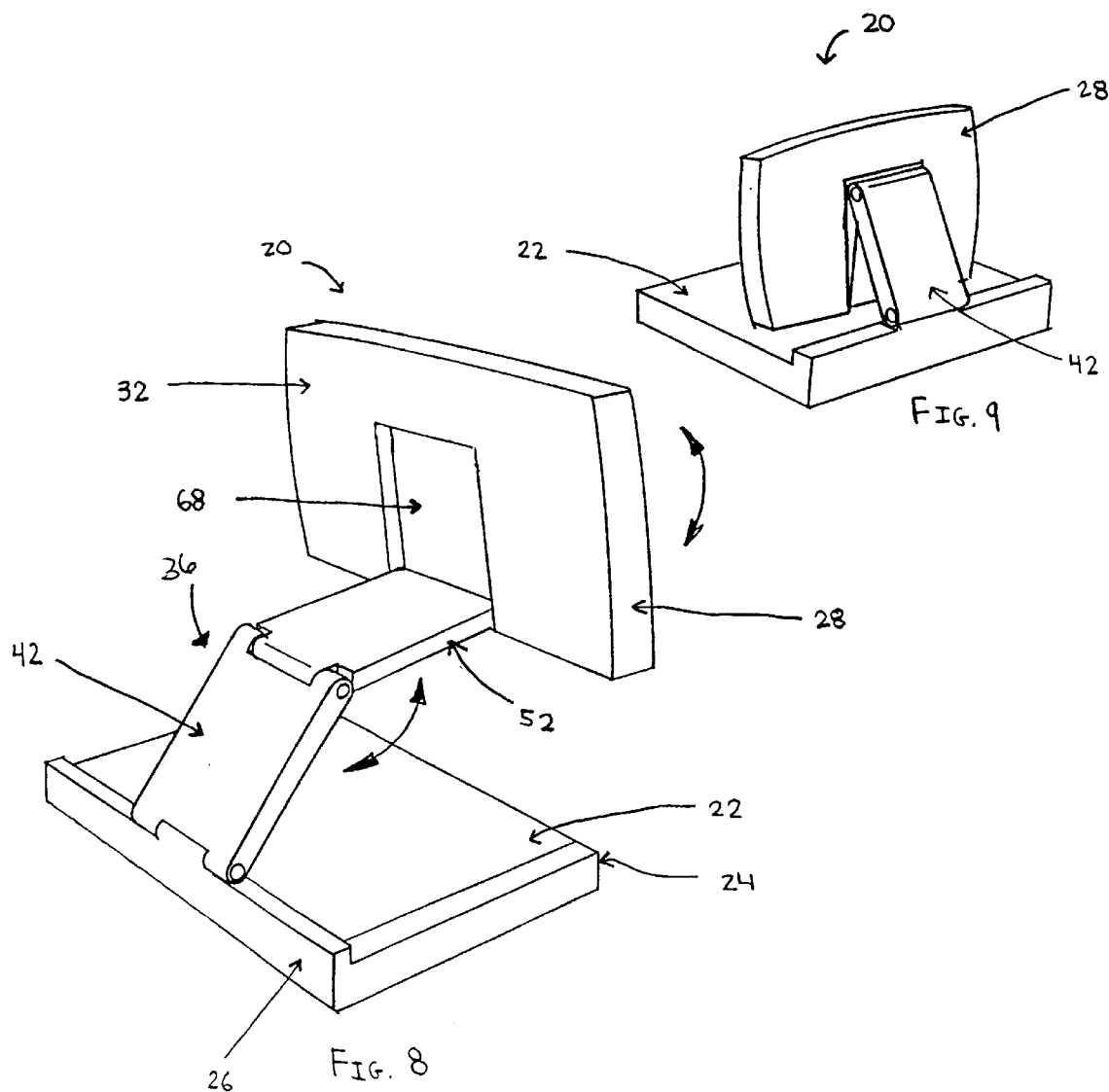

COMPUTER WITH ARTICULATED MECHANISM

This application is related to application Ser. No. 09/551,287, for Computer Display Support, filed concurrently herewith and assigned to the assignee of the present application.

FIELD OF THE INVENTION

The present invention relates to a computer and, more particularly, to a computer with an articulated mechanism that allows a user to view the display from any of a plurality of viewing angles at any of a plurality of spatial positions.

BACKGROUND

Portable computers or notebooks typically comprise a computer base and a display. The computer base generally holds the computer processor, memory, circuitry and other components, such as a keyboard or a disk drive. Typically, the display is attached to the computer base by a hinge forming a single pivot axis, wherein the display can be folded down for carrying or up so that the user can select an appropriate viewing angle.

A disadvantage with such portable computers is that the single pivot axis limits the number of viewing positions that the user can select. The disadvantage is particularly noticeable in environments, such as airplanes and cars, in which the computer is used on the user's lap, briefcase, pull out tray, and the like. Whether used on a desk or on a lap, it is desirable to provide the user with a portable computer that includes a large spectrum of viewing positions for ease and comfort of use.

SUMMARY

A computer according to the present invention includes a computer base, a display, a pivot mechanism and an articulated mechanism. The computer base has a front edge and a rear edge with a keyboard disposed on the computer base in an orientation for usage from the front edge. The articulated mechanism is interconnected with the rear edge of the computer base, the pivot mechanism and the display. The articulated mechanism has a motion that moves the display toward and away from the front edge and in elevation relative to the computer base. The display is rotatable about the pivot mechanism in an arc with the viewing surface facing the front edge. The articulated mechanism is capable of moving the display and the articulated mechanism to a folded position in which the display overlies the computer base. Optionally, a pop-up mechanism is interconnected with the display and articulated mechanism. The pop-up mechanism has a latch that, when latched, holds the articulated mechanism in the folded position and that, when unlatched, causes the articulated mechanism to pop-up from the display and from the folded position.

BRIEF DESCRIPTION OF THE DRAWINGS

FIG. 2 is a perspective view of the computer of FIG. 1 in a closed position;

FIG. 3 is a perspective view of the computer of FIG. 1 in an open position;

FIG. 8 is a perspective view of another embodiment of the computer of the invention in one viewing position;

FIG. 9 is a perspective view of the computer of FIG. 8 in another viewing position;

DESCRIPTION OF THE PREFERRED AND ALTERNATIVE EMBODIMENTS

Figure 1:
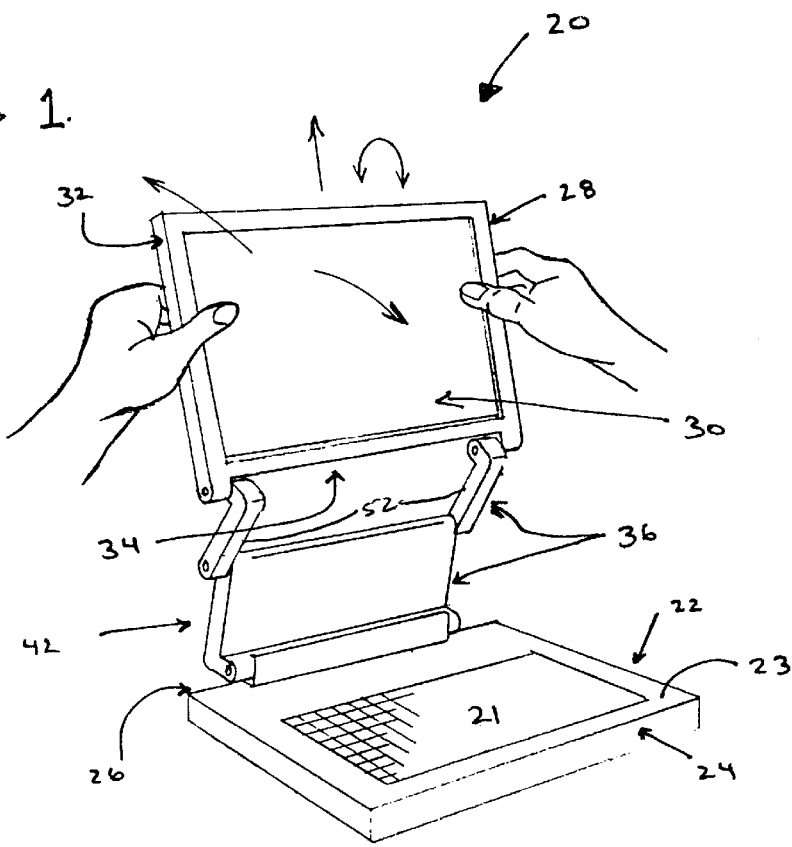
FIG. 1 is a perspective view of a computer according to the present invention.

Referring to FIG. 1, computer 20 includes a computer base 22, a display 28 and an articulated mechanism 36. Computer base 22 includes a top surface 23, a front edge 24 and a rear edge 26. Display 28 includes a viewing surface 30, a back surface 32, and a bottom edge 34. A keyboard 21 is disposed on top surface 23 in an orientation for user usage from front edge 24.

Figure 1A:
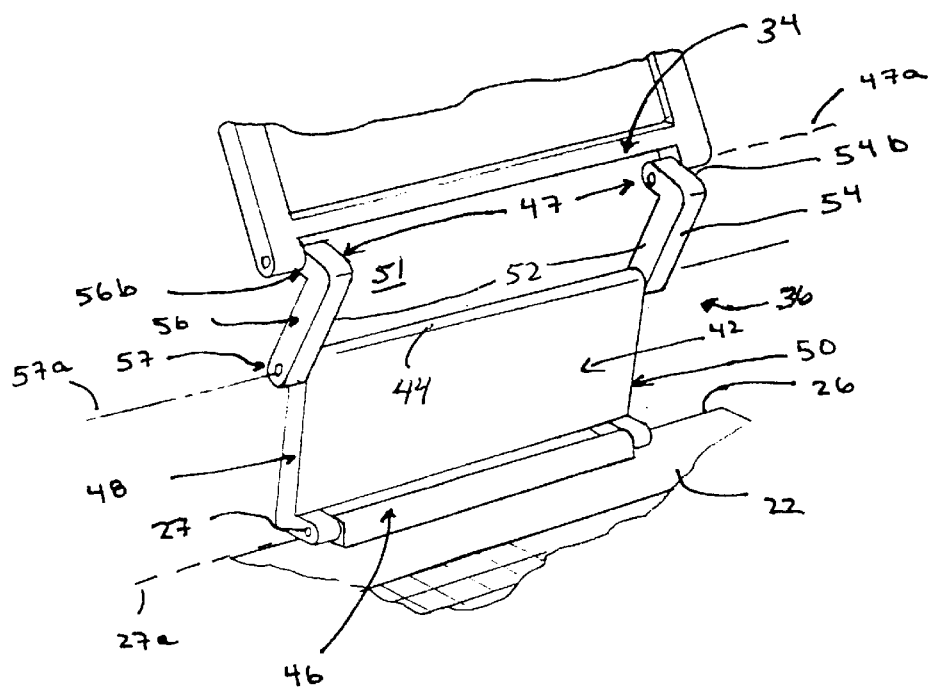
FIG. 1A is an enlarged view of a portion of FIG. 1 showing the articulated mechanism.

Referring to FIGS. 1 and 1A, computer base 22 is interconnected to display 28 by articulated mechanism 36. Articulated mechanism 36 includes a first arm member 42 and a second arm member 52. A pivot mechanism 27 interconnects first arm member 42 and rear edge 26 of computer base 22. A pivot mechanism 47 interconnects second arm member 52 and a bottom edge 34 of display 28. First arm member 42 and 52 are pivotally coupled at a pivot mechanism 57.

Referring to FIG. 1A, pivot mechanism 27 may be formed with any suitable hardware, such as one or more hinges, along a pivot axis 27a that extends laterally adjacent rear edge 26 of computer base 22. Pivot mechanism 47 may be similarly formed along a pivot axis 47a that extends laterally adjacent bottom edge 34 of display 28. Pivot mechanism 57 may be similarly formed along a pivot axis 57a. Pivot axes 27a, 47a and 57a are preferably parallel.

First arm member 42 includes a top edge 44, a bottom edge 46, left edge 48 and a right edge 50. Second arm member 52 includes a pair of arms 54 and 56 spaced apart thereby forming a recess 51 bounded by arms 54 and 56. First pivot mechanism 27 interconnects bottom edge 46 of first arm member 42 with the rear edge 46 of computer base 22. Second pivot mechanism 47 interconnects a first end 54b of arm 54 and a first end 56b of arm 56 with bottom edge 34 of display 28. Third pivot mechanism 47 couples a second end 54a of arm 54 and a second end 56a of arm 56 to top edge 44 of first arm member 42.

Articulated mechanism 36 enables display 28 to have a rather large number of viewing positions. In particular, rotation of second arm member 52 about third pivot mechanism 57 allows display 28 to assume a large number of spatial positions relative to computer base 22. The pivotal motion about pivot axis 47a together with the pivotal motion about pivot axes 27a and 57a enable a user to move display 22 up, down, forward, or backward to locate a preferred viewing position.

Figure 4:
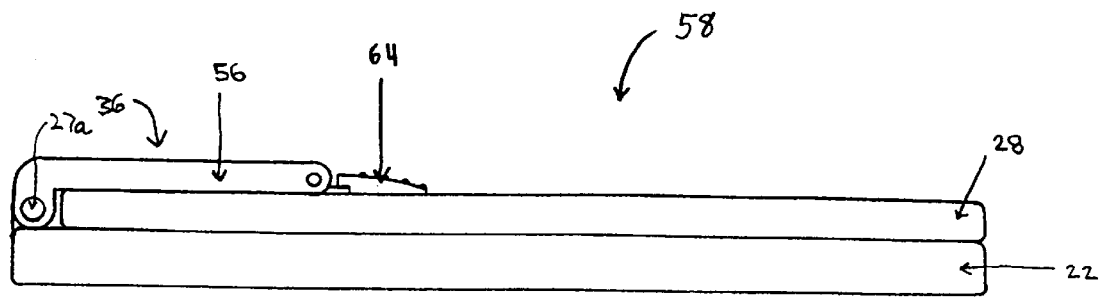
FIG. 4 is a side elevation view of the computer of FIG. 1 in a closed position.

Referring to FIGS. 2 and 4, computer 22 is shown in a folded position 58 in which display 28 is folded down to overlie computer base 22 and articulated mechanism 36 overlies display 28 to form a sandwich structure. A latching mechanism 64 secures articulated mechanism 36 to back surface 32 of display 28. When so secured, first arm member 42 rotates into recess 51 (FIG. 1A) such that arm member 42 is nested with arms 54 and 56 of arm member 52 (FIG. 1A).

Figure 5:
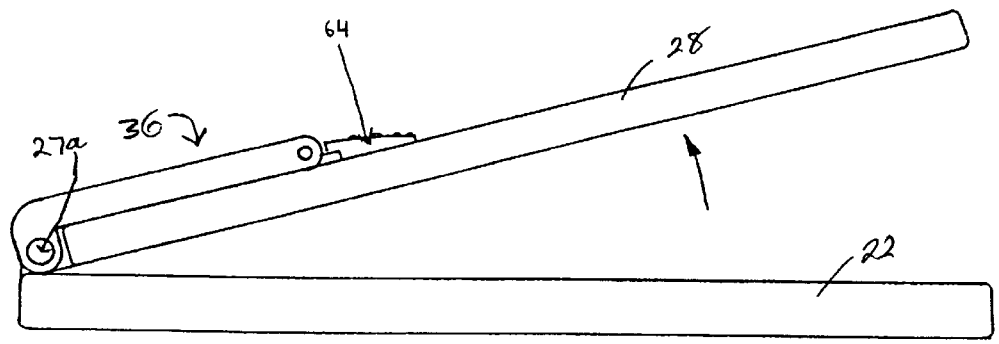
FIG. 5 is a side elevation view of the computer of FIG. 1 in an open position.

Referring to FIG. 3, a recess 68 may optionally be formed in back surface 32 of display 28 to hold articulated mechanism 36 when secured by locking mechanism 64 to back surface 32. Referring to FIGS. 4 and 5, with latching mechanism 64 latched, display 28 and articulated mechanism 36 can be rotated about pivot axis 27a to any desired viewing position similar to a typical prior art single pivot or hinged display and computer base.

Figure 6:
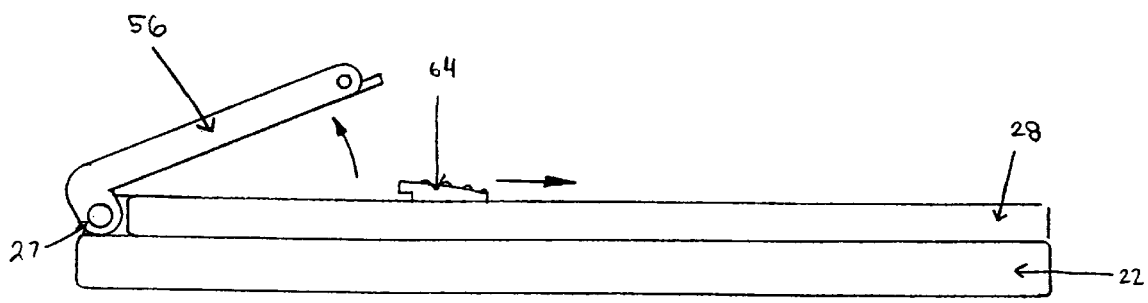
FIGS. 6 and 7 are side elevation views of the computer of FIG. 1 in partially open positions.
Figure 7:
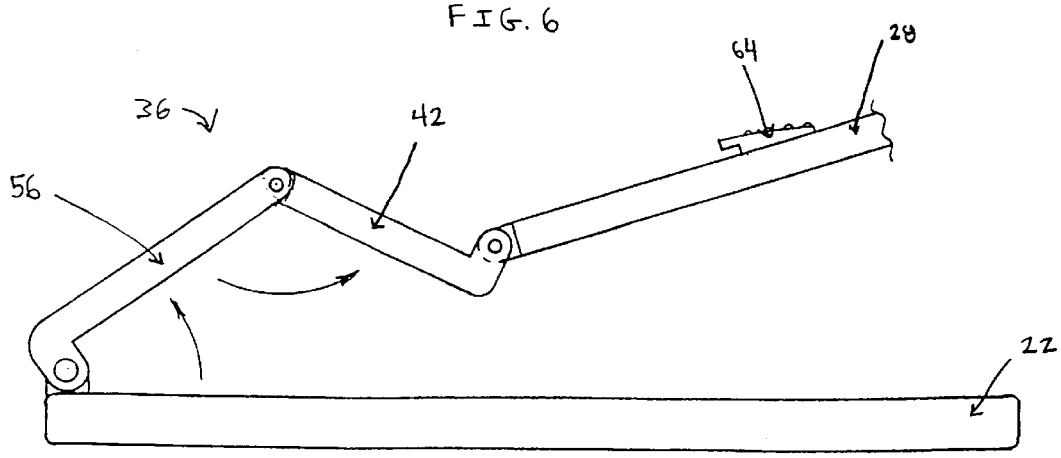

Referring to FIGS. 6 and 7, latching mechanism 64 is shown released, thereby allowing first arm member 42 and second arm member 52 (only arm 56 portion is shown) to rotate out of a substantially parallel plane into a variety of extended or spatial positions, whereby display 28 can be adjusted in a plurality of viewing angles above computer base 22. In a preferred embodiment, pivot mechanism 27 includes a spring (not shown) that is compressed when articulated mechanism 36 is latched by latch mechanism 64 to the folded position of FIGS. 2 and 4. When latch mechanism 64 unlatches articulated mechanism 36, the spring is released and returns articulated mechanism 36, in a pop-up action, to a popup position, such as shown in FIG. 6. From the popup position, articulated mechanism 36 and display 28 can be unfolded as shown in FIG. 7. It will be apparent to those skilled in the art that pivot mechanism 27 may include a popup mechanism that allows for selection of more than one popup position. For example, two or more stops may be arranged with a selector that selects different ones of the stops for different angular popup positions of articulated mechanism 36 and display 28.

Referring to FIGS. 8 and 9, an alternate embodiment has recessed portion 68 that is formed in back surface 32 of display 28 to receive articulated mechanism 36 in a nested relation. In this alternate embodiment, arm member 42 is slightly larger than arm member 52 such that arm member 52 nests in arm member 42 when articulated mechanism 36 is nested in recess 68 of display 28.

Figure 10:
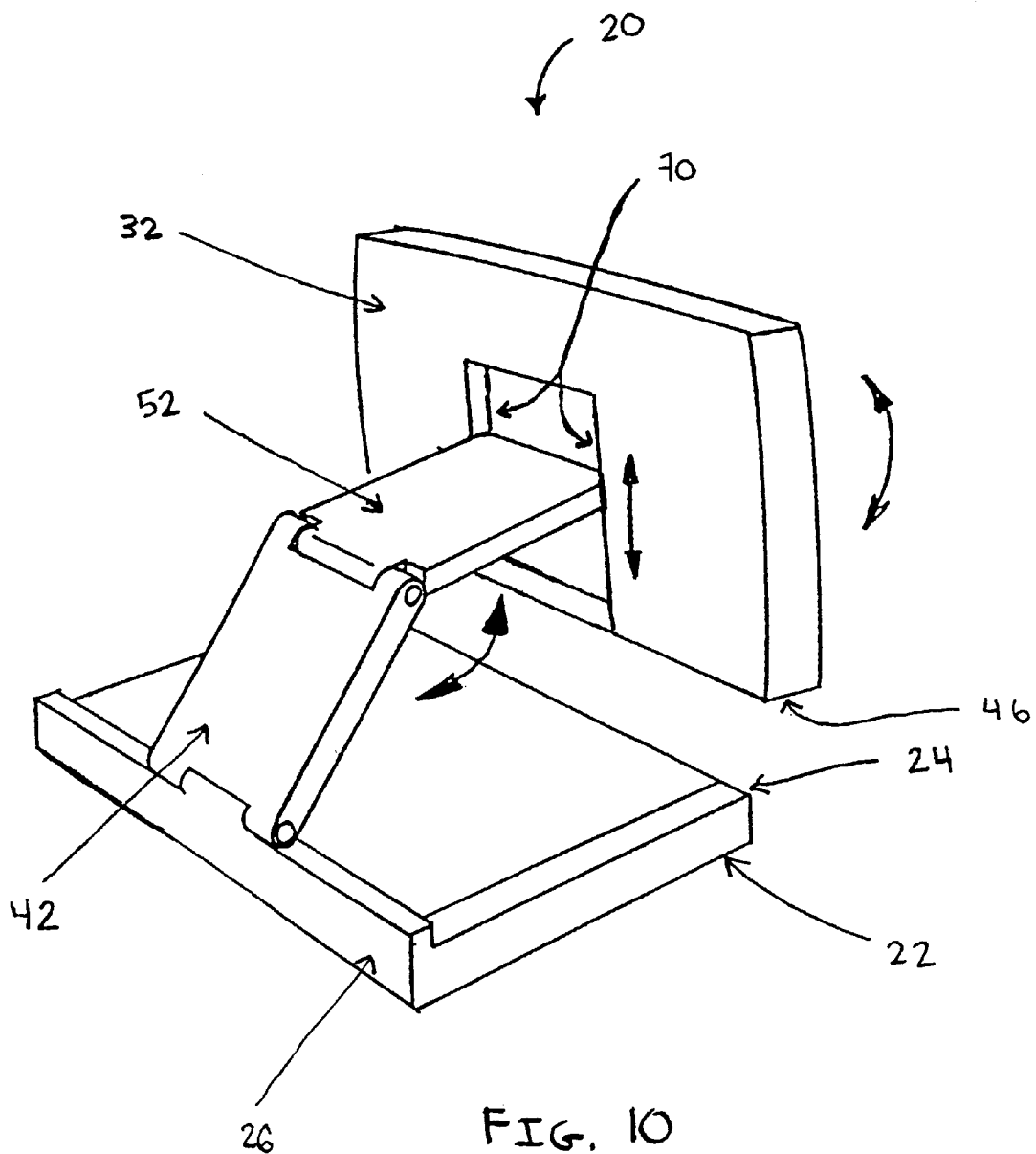
FIG. 10 is a perspective view of the computer of FIG. 8 showing an alternative method for moving the display.

Referring to FIG. 10, second arm member 52 may optionally be slidably attached to a pair of opposite facing walls 70 in recessed portion 68. Thus, display 28 can be moved to any spatial position via articulated mechanism 36 and can also be moved in a plane along recessed portion 68 above computer base 22.

Figure 11:
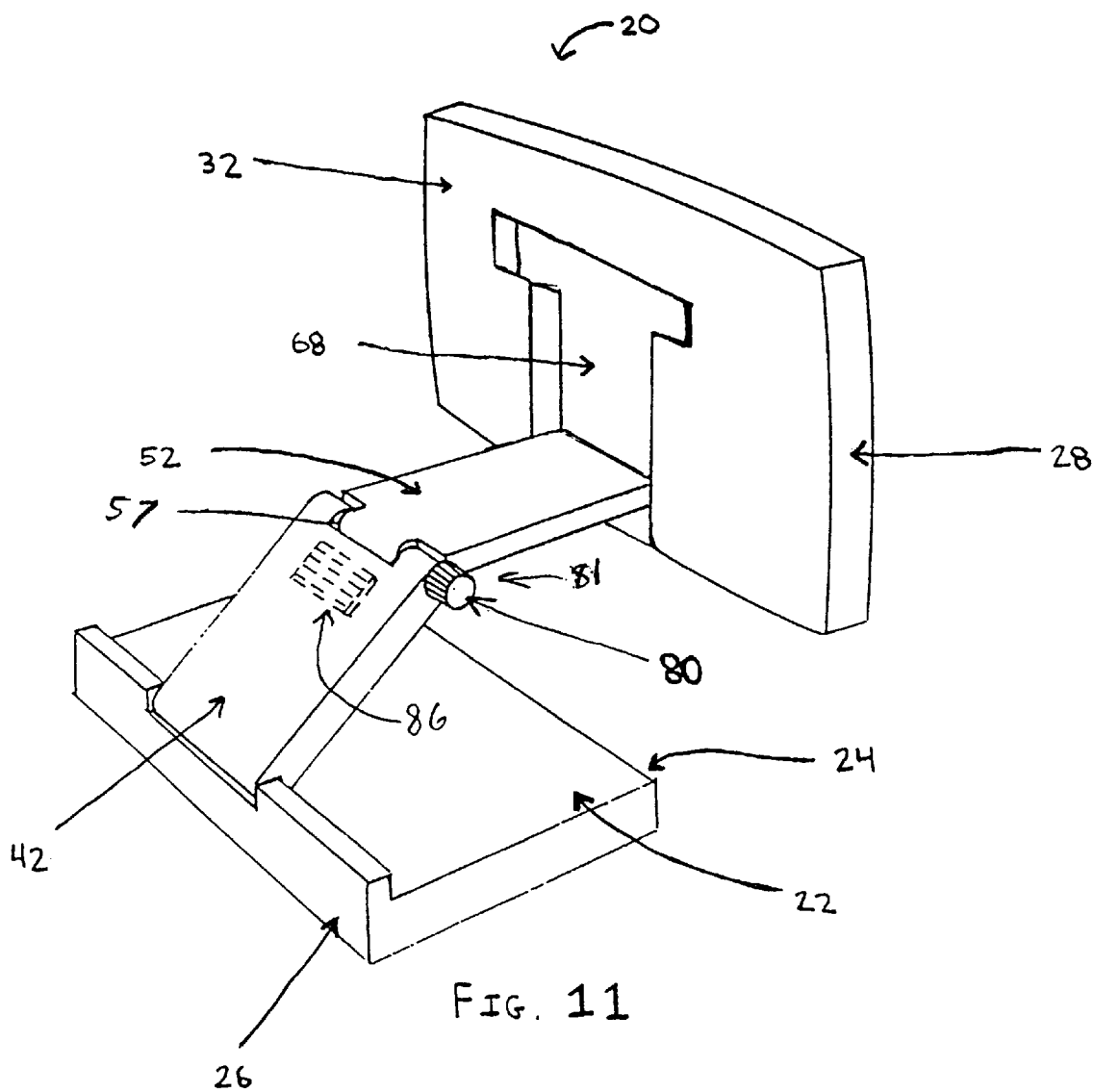
FIG. 11 is a perspective view of a third embodiment of the computer of the present invention.

Referring to FIG. 11, a stabilizer mechanism 81 includes a locking knob 80 that is attached at pivot mechanism 57 where first arm member 42 and second arm member 52 interconnect. Locking knob 80 is adjustable to lock first arm member 42 and second arm member 52 together at a desired spatial position. Instead of locking knob 80, a sliding lock 86 (shown in phantom) may be used. Alternatively, stabilizer mechanism 81 may include one or more friction clutches for each of the pivot mechanisms 27, 47 or 57 shown in FIGS. 1 through 11.

Figure 12:
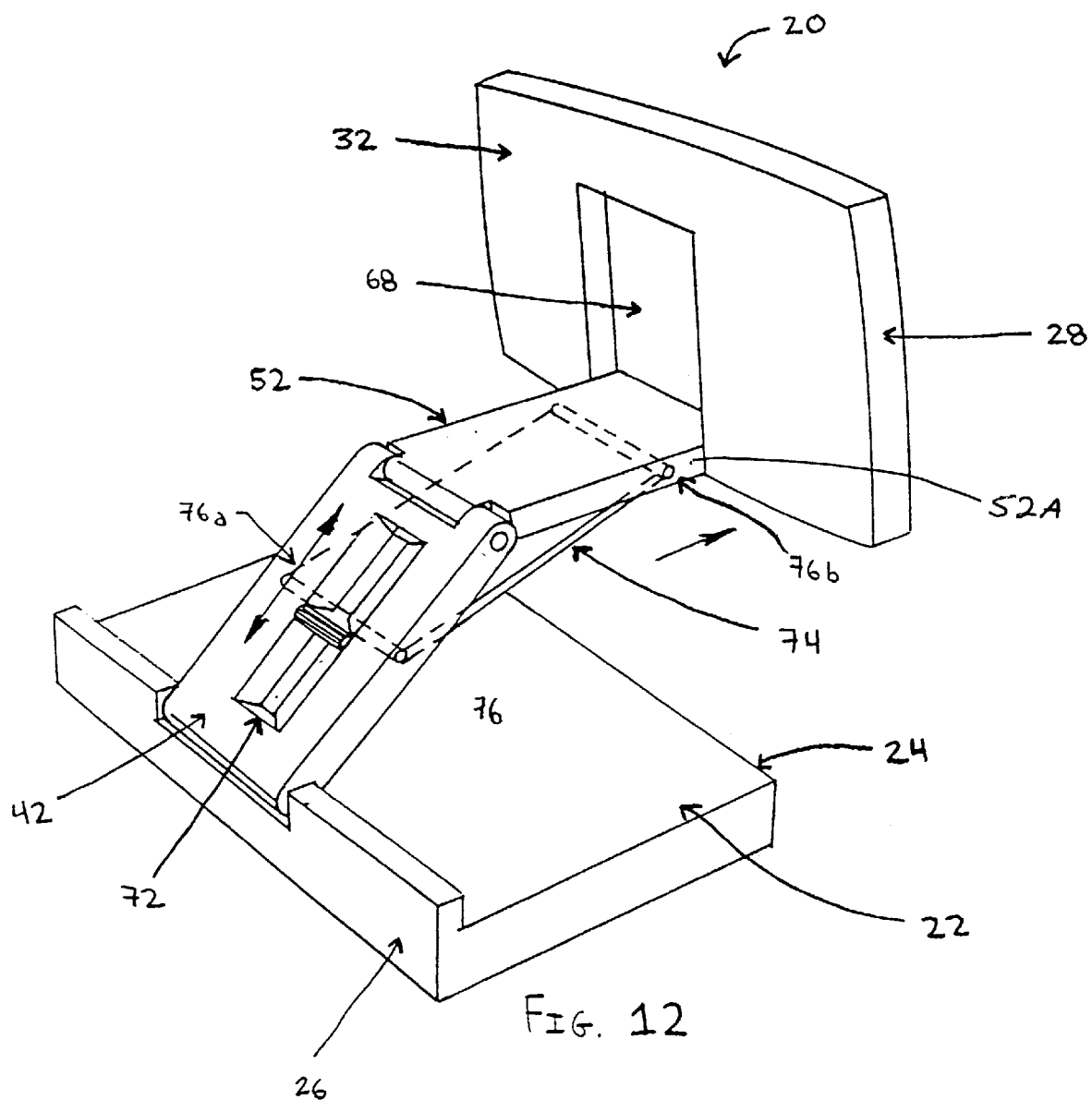
FIG. 12 is a perspective view of a fourth embodiment of the computer of the present invention.

Referring to FIG. 12, another alternate embodiment of computer 20 includes a channel 72 located centrally in arm member 42 with a support member 74 disposed therein. Support member 74 includes a first end 76a and a second end 76b. Channel 72 is adapted to receive first end 76a of support member 74, wherein first end 76a is movably attached to channel 72 thereby allowing support member 74 to slide along channel 72. Second end 76b of support member 74 is movably attached to first end 52a of second arm member 52, thereby allowing support member 74 to provide additional support to articulated mechanism 36 as display 28 is moved about computer base 22 into a plurality of spatial positions.

Figure 13:
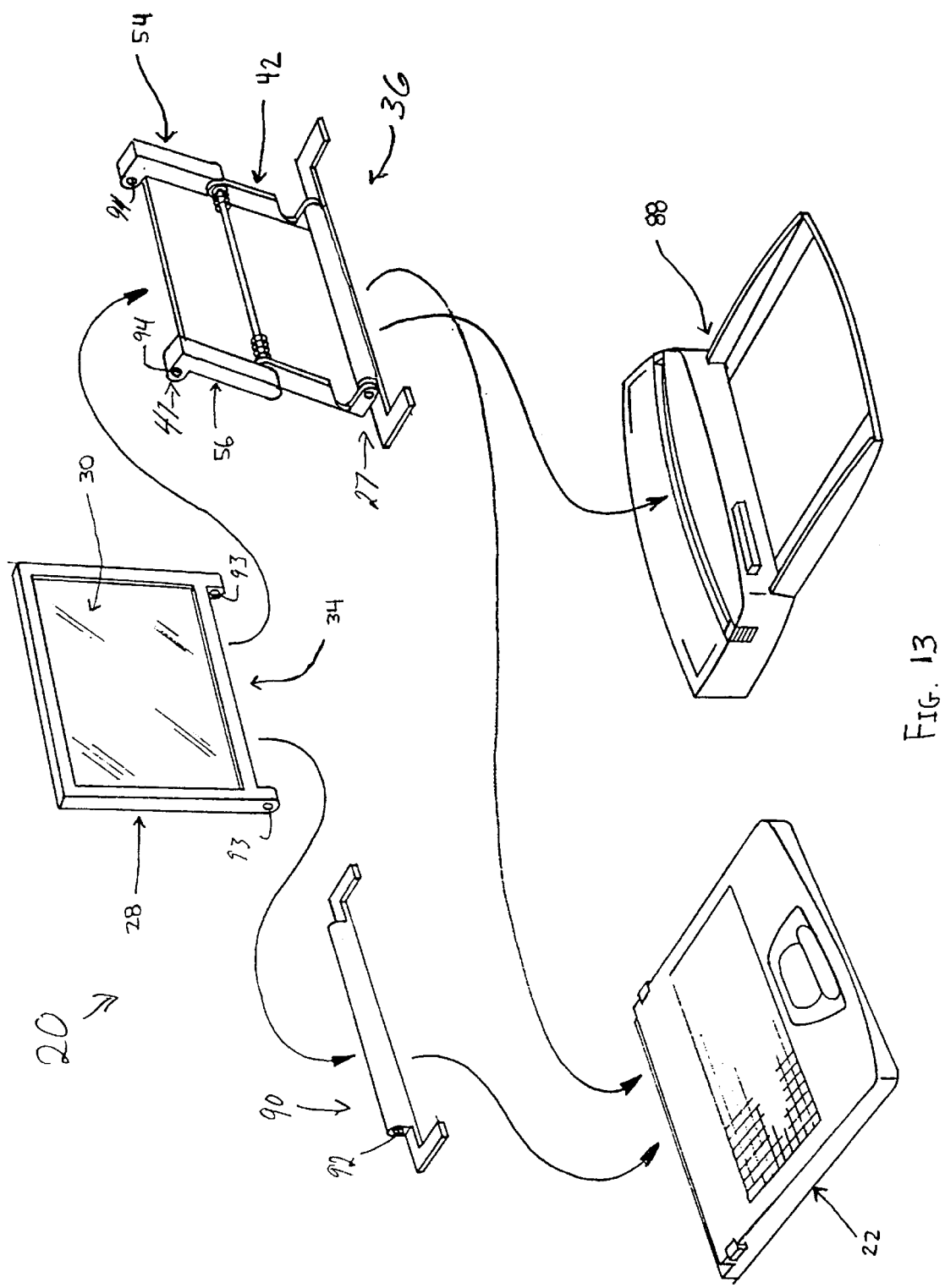
FIG. 13 is a perspective view of the computer of the invention as used with a docking station.

Referring to FIG. 13, computer 20 is shown in a modularized form that can be configured as a conventional notebook computer, an articulated mechanism computer or used with a docking station 88 that accepts the articulated mechanism. To this end, a hinge 90 is provided for connection to display 28 and to computer base 22 for the conventional notebook computer configuration. Hinge 90 has a form and fit connectivity design that connects to a mating connectivity design on computer base 22 and to a mating connectivity design on display 28. In this configuration, pivoting action is provided by a rod (not shown) that is threaded through a bore 92 in hinge 90 and a pair of bores 93 formed in bottom edge 34 of display 28.

Pivot mechanism 27 of articulated mechanism 36 has a form and fit that also connects with the mating connectivity design of computer base 22. Pivot mechanism 47 has a form and fit design that connects with the mating connectivity design of display 28. Thus, a rod (not shown) is threaded through a pair of bores 94 of pivot mechanism 47 and bores 93 of display 28. Docking station 88 has a connectivity design that is substantially identical to that of computer base 22, thereby enabling docking station 88 to be configured with display 28 via hinge 90 or via articulated mechanism 36.

While several embodiments in accordance with the invention have been shown and described, it is to be clearly understood that the embodiments are susceptible to numerous changes apparent to one skilled in the art. Accordingly, the invention is only limited by the following claims.

What is claimed is:

1. A computer comprising:
   a computer base having a front edge and a rear edge with a keyboard disposed on the computer base in an orientation for usage from the front edge;
   a display having a viewing surface;
   an articulated mechanism that includes first and second arm members;
   a pop-up mechanism interconnected with the display and articulated mechanism, the pop-up mechanism having a latch that, when latched, holds the articulated mechanism in the folded position and that, when unlatched, causes the articulated mechanism to pop-up from the display and from the folded position; and means for pivotally interconnecting the articulated mechanism with the rear edge of the computer base by way of the first arm member, the second arm member having means for pivotally interconnecting with the first arm member and the display, wherein the articulated mechanism has a motion that moves the display toward and away from the front edge and in elevation relative to the computer base, and wherein the display is rotated in an arc with the viewing surface facing the front edge, wherein the motion is capable of moving the display and the articulated mechanism to a folded position in which the display overlies the computer base.

2. The computer of claim 1, wherein the articulated mechanism overlies the display when in the folded position.

3. The computer of claim 1 wherein at least one of the first and second arm members is removable from the computer.

4. A computer comprising:

a computer base having a front edge and a rear edge with a keyboard disposed on the computer base in an orientation for usage from the front edge;

a display having a viewing surface;

an articulated mechanism that includes first and second arm members; and means for pivotally interconnecting the articulated mechanism with the rear edge of the computer base by way of the first arm member, the second arm member having means for pivotally interconnecting with the first arm member and the display, wherein the articulated mechanism has a motion that moves the display toward and away from the front edge and in elevation relative to the computer base, and wherein the display is rotated in an arc with the viewing surface facing the front edge; and a first pivot mechanism interconnected with the display and a second pivot mechanism interconnected with the computer base, and wherein the display is rotatable about the first pivot mechanism to and from the folded position, and wherein the articulated mechanism is rotatable about the second pivot mechanism to and from the folded position;

a stabilizer mechanism that stabilizes the articulated mechanism at any spatial position with a range of the motion thereof wherein the stabilizer mechanism includes a locking knob operatively engaged with the articulated mechanism, wherein the locking knob can be adjusted to secure the articulated mechanism at any spatial position of the range of motion.

5. A computer comprising:

a computer base having a front edge and a rear edge with a keyboard disposed on the computer base in an orientation for usage from the front edge;

a display having a viewing surface;

an articulated mechanism that includes first and second arm members;

a first pivot mechanism interconnected with the display and a second pivot mechanism interconnected with the computer base, and wherein the display is rotatable about the first pivot mechanism to and from the folded position, and wherein the articulated mechanism is rotatable about the second pivot mechanism to and from the folded position; and means for pivotally interconnecting the articulated mechanism with the rear edge of the computer base by way of the first arm member, the second arm member having means for pivotally interconnecting with the first arm member and the display, wherein the articulated mechanism has a motion that moves the display toward and away from the front edge and in elevation relative to the computer base, and wherein the display is rotated in an arc with the viewing surface facing the front edge wherein the first pivot mechanism is slidably positioned in a recess located in the display, whereby the display is rotatable about the first pivot mechanism and is slidable in the recess.

6. A computer comprising:

a computer base and a display;

an articulated mechanism that interconnects the computer base and the display, wherein the articulated mechanism has motion that moves the display forward and backward and in elevation relative to the computer base, and wherein the motion is capable of moving the display and the articulated mechanism to a folded position in which the display overlies the computer base; and a pop-up mechanism interconnected with the display and articulated mechanism, the pop-up mechanism having a latch that, when latched, holds the articulated mechanism in the folded position and that, when unlatched, causes the articulated mechanism to pop-up from the display and from the folded position to a pop-up position.

7. The computer of claim 6, further comprising:

a first pivot mechanism interconnected with the display;

a second pivot mechanism interconnected with the articulated mechanism, wherein the articulated mechanism is movable about the second pivot mechanism and the display is moveable about the first pivot mechanism to position the articulated mechanism and the display in folded position.

8. The computer of claim 7, wherein the articulated mechanism, when in the folded position, overlies the display.

9. The computer of claim 7, wherein the articulated mechanism, when in the folded position is nested in a recess located on the display.

10. The computer of claim 6, wherein the articulated mechanism includes first and second arm members that are nested together in the folded position.

11. The computer of claim 10, wherein the articulated mechanism includes first and second arm members that are nested together in the folded position.

12. The computer of claim 6, wherein the articulated mechanism is removable from the computer.

13. A computer system comprising:

a computer including a base having a front edge and a rear edge with a keyboard disposed on the base of the computer in an orientation for usage from the front edge and a first connectivity design;

a display having a viewing surface;

an articulated mechanism removably attached to the base of the computer and connecting the display to the first connectivity design on the base of the computer;

a docking station for accepting the computer, wherein the docking station has a second connectivity design sub stantially identical to the first connectivity design wherein the docking station is capable of being configured with the articulated mechanism; and means for pivotally interconnecting the articulated mechanism with the rear edge of the base of the computer and the display, wherein the articulated mechanism has a motion that moves the display toward and away from the front edge and in elevation relative to the base of the computer, and wherein the display is rotated in an arc with the viewing surface facing the front edge.

14. The computer system of claim 13 further comprising a hinge having a form and fit for connecting to the first connectivity design wherein the display is capable of being connected to the base of the computer with the hinge after the articulated mechanism is removed from the computer.

15. The computer system of claim 13 further comprising a hinge having a form and fit for connecting to the second connectivity design wherein the display is capable of being connected to the docking station with the hinge.

16. The computer of claim 13 wherein said computer has a first connectivity design removably configuring the articulated mechanism; and a docking station for accepting the computer, wherein the docking station has a second connectivity design substantially identical to the first connectivity design of the computer wherein the docking station is capable of being configured with the articulated mechanism.

* * * * *